(12) United States Patent
Kadota

(10) Patent No.: US 8,203,734 B2
(45) Date of Patent: Jun. 19, 2012

(54) IMAGE FORMATION USING A PORTABLE STORAGE MEDIUM

(75) Inventor: Masatoshi Kadota, Aichi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1118 days.

(21) Appl. No.: 12/058,148

(22) Filed: Mar. 28, 2008

(65) Prior Publication Data

US 2008/0239384 A1 Oct. 2, 2008

(30) Foreign Application Priority Data

Mar. 29, 2007 (JP) ................................. 2007-088588

(51) Int. Cl.
*G06F 3/12* (2006.01)
(52) U.S. Cl. ........................ 358/1.15; 358/1.16; 358/403
(58) Field of Classification Search ................... 358/1.1, 358/1.15, 1.16, 400, 401, 403, 404, 444
See application file for complete search history.

(56) References Cited

U.S. PATENT DOCUMENTS

| | | | | |
|---|---|---|---|---|
| 5,164,831 | A * | 11/1992 | Kuchta et al. ............... | 348/231.7 |
| 6,469,770 | B2 | 10/2002 | Hoshino et al. | |
| 6,498,658 | B1 * | 12/2002 | Sekikawa ...................... | 358/1.16 |
| 6,674,472 | B1 | 1/2004 | Tsutsui | |
| 6,711,637 | B2 | 3/2004 | Tateyama | |
| 6,774,980 | B2 | 8/2004 | Hoshino et al. | |
| 6,856,414 | B1 * | 2/2005 | Haneda et al. ............... | 358/1.15 |
| 6,967,675 | B1 | 11/2005 | Ito et al. | |
| 6,996,293 | B1 | 2/2006 | Watanabe | |
| 7,369,262 | B2 * | 5/2008 | Masumoto et al. .......... | 358/1.16 |
| 2003/0193581 | A1 | 10/2003 | Miyata | |
| 2004/0075746 | A1 * | 4/2004 | Takamine et al. .......... | 348/207.1 |

FOREIGN PATENT DOCUMENTS

| | | |
|---|---|---|
| JP | 05-021267 | 3/1993 |
| JP | 11-098290 | 4/1994 |
| JP | 11-136477 | 5/1999 |
| JP | 11-317930 | 11/1999 |
| JP | 11-321009 | 11/1999 |
| JP | 2971931 | 11/1999 |
| JP | 2001-061060 | 3/2001 |
| JP | 2001-197429 | 7/2001 |

(Continued)

OTHER PUBLICATIONS

Notification of Reasons for Rejection in Japanese Application 2007-088588; dated Apr. 14, 2009.

(Continued)

*Primary Examiner* — Thomas D Lee
(74) *Attorney, Agent, or Firm* — Banner & Witcoff, Ltd.

(57) ABSTRACT

In an image formation system comprising a data processing device and an image formation device, the data processing device includes: a print data storing unit which stores print data in a portable storage medium; an image data generating unit which generates image data to be displayed by the image formation device in regard to the print data; and an image data storing unit which stores the image data in the portable storage medium while associating the image data with the print data. The image formation device includes an image formation unit which forms an image on a print medium based on print data stored in the portable storage medium while being associated with image data corresponding to the image displayed by a display unit and selected by a selection unit when printing is requested regarding the image.

27 Claims, 13 Drawing Sheets

FOREIGN PATENT DOCUMENTS

| | | |
|---|---|---|
| JP | 2001-273206 | 10/2001 |
| JP | 2001-337994 | 12/2001 |
| JP | 2004-048183 | 2/2004 |
| JP | 2004-241199 | 8/2004 |
| JP | 2004-361814 | 12/2004 |
| JP | 2005-110077 | 4/2005 |
| JP | 2005-111843 | 4/2005 |
| JP | 2005-170012 | 6/2005 |
| JP | 3747914 | 2/2006 |
| JP | 2006-180324 | 7/2006 |
| JP | 2006-285745 | 10/2006 |
| JP | 2001-195208 | 7/2007 |
| JP | 2007-174077 | 7/2007 |

OTHER PUBLICATIONS

Notification of Reasons of Rejection for Japanese Application No. 2007-088588, Mailed Jun. 30, 2009.

* cited by examiner

IMAGE FORMATION USING A PORTABLE STORAGE MEDIUM

CROSS-REFERENCE TO RELATED APPLICATION

This application claims priority under 35 U.S.C. §119 from Japanese Patent Application No. 2007-088588 filed on Mar. 29, 2007. The entire subject matter of the application is incorporated herein by reference.

BACKGROUND

1. Technical Field

An image formation system including a data processing device for writing print data to a portable storage medium and an image formation device for reading out the print data from the portable storage medium and forming an image on a print medium are needed to execute printing without using computer networks (e.g., LAN, internet, etc.) in order to keep data for printing from transmitted through the computer networks view of security protection.

The present invention relates to such an image formation system as well as a data processing device, a computer-readable record medium and an image formation device capable of forming the image formation system.

2. Related Art

An image formation system which includes a data processing device (e.g. personal computer) for writing print data to a portable storage medium (USB memory, memory card, etc.) and an image formation device (e.g. printer) for reading out the print data from the portable storage medium and forming an image on a print medium (paper, etc.) has been proposed. In such an image formation system, print data that should be printed out has to be selected on the image formation device's side in cases where two or more pieces of print data have been written to the portable storage medium. Even when only a piece of print data has been written to the portable storage medium, the user can hope to check the print data before the execution of printing. In consideration of such cases, there has been proposed a method displaying preview images (of pages that can be printed out) on the screen (display unit) of a printer and thereby letting the user select print data (print file) to be printed out. An example of such a system is shown in Japanese Patent Provisional Publication No. HEI 11-136477.

SUMMARY OF THE INVENTION

However, even with the above method displaying the preview images, the user can not make the selection of print data smoothly and with ease in cases where the display unit of the printer is small or the format of documents as candidates for printing is uniform (e.g. contract documents). It is of course possible to display file names of print data instead of the preview images; however, there is a possibility of incorrect file names displayed on the screen since characters forming the file names can get garbled depending on the specifications of the printer when non-alphanumeric characters (kanji characters, Japanese syllabary characters, etc.) are used for the file names. The file names can be displayed correctly with no garbled character when file names made up of alphanumeric characters only are used. However, display of such file names (made up of alphanumeric characters only) on the screen is not easily recognizable to people usually using non-alphanumeric characters (e.g. Japanese people).

The present invention which has been made in consideration of the above problems is advantageous in that an image formation system, letting the user easily and correctly make the check or selection of print data (stored in a portable storage medium) on the image formation device's side, can be provided as well as a data processing device, a computer-readable record medium and an image formation device capable of forming the image formation system.

In accordance with an aspect of the present invention, there is provided an image formation system comprising a data processing device which stores print data in a portable storage medium and an image formation device which forms an image on a print medium by reading out the print data from the portable storage medium. The data processing device includes: a print data storing unit which stores the print data in the portable storage medium; an image data generating unit which generates image data to be displayed by the image formation device in regard to the print data; and an image data storing unit which stores the image data generated by the image data generating unit in the portable storage medium while associating the image data with the print data. The image formation device includes: a display unit which displays an image corresponding to the image data stored in the portable storage medium, an image formation unit which forms an image on a print medium based on print data that has been stored in the portable storage medium while being associated with image data corresponding to the image displayed by the display unit when printing is requested in regard to the image displayed by the display unit, a selection unit which selects an image displayed by the display unit according to a user operation, and an image formation unit which forms an image on a print medium based on print data that has been stored in the portable storage medium while being associated with image data corresponding to the image displayed by the display unit and selected by the selection unit when printing is requested in regard to the image selected by the selection unit.

In the data processing device of the image formation system configured as above, the print data storing unit stores print data (for image formation) in a portable storage medium, the image data generating unit generates image data to be displayed by the image formation device in regard to the print data, and the image data storing unit stores the image data in the portable storage medium while associating the image data with the print data.

Meanwhile, in the image formation device, the display unit displays an image corresponding to the image data stored in the portable storage medium. When printing is requested in regard to an image displayed by the display unit, the image formation unit forms an image on a print medium (e.g. paper) based on print data that has been stored in the portable storage medium while being associated with image data corresponding to the image displayed by the display unit.

As above, in the image formation system in accordance with the present invention, image data corresponding to the print data (for image formation) is generated by the image data generating unit of the data processing device, and an image corresponding to the image data is displayed by the display unit of the image formation device. Therefore, the user is allowed to easily and correctly make the check or selection of print data (stored in the portable storage medium) on the image formation device's side as long as the image data (associated with the print data) is generated so that the image corresponding to the image data (i.e. the image displayed by the display unit) will be easily recognizable to the user.

In accordance with another aspect of the present invention, there is provided a data processing device comprising: a print data storing unit which stores print data, to be used by an image formation device for forming an image on a print medium, in a portable storage medium; an image data generating unit which generates image data to be displayed by the image formation device in regard to the print data; and an image data storing unit which stores the image data generated by the image data generating unit in the portable storage medium while associating the image data with the print data.

In the data processing device configured as above, the print data storing unit stores print data (to be used by an image formation device for forming an image on a print medium) in a portable storage medium, the image data generating unit generates image data to be displayed by the image formation device in regard to the print data, and the image data storing unit stores the image data in the portable storage medium while associating the image data with the print data.

Thus, effects similar to those of the aforementioned image formation system can be achieved by handling the portable storage medium (in which the print data and the image data have been stored by the data processing device) by use of an image formation device including a display unit which displays an image corresponding to the image data stored in the portable storage medium and an image formation unit which forms an image on a print medium based on print data that has been stored in the portable storage medium while being associated with image data corresponding to the image displayed by the display unit when printing is requested in regard to the image displayed by the display unit.

Specifically, image data corresponding to the print data (for image formation) is generated by the image data generating unit, and an image corresponding to the image data is displayed by the image formation device. Therefore, the user is allowed to easily and correctly make the check or selection of print data (stored in the portable storage medium) on the image formation device's side as long as the image data (associated with the print data) is generated so that the image corresponding to the image data (i.e. the image displayed by the display unit) will be easily recognizable to the user.

In accordance with another aspect of the present invention, there is provided a computer-readable record medium storing computer-readable instructions that cause a computer to function as: a print data storing unit which stores print data, to be used by an image formation device for forming an image on a print medium, in a portable storage medium; an image data generating unit which generates image data to be displayed by the image formation device in regard to the print data; and an image data storing unit which stores the image data generated by the image data generating unit in the portable storage medium while associating the image data with the print data.

By making a computer execute the computer-readable instructions stored in the computer-readable record medium, the aforementioned data processing device can be configured and implemented with ease.

In accordance with another aspect of the present invention, there is provided an image formation device comprising: a display unit which displays an image corresponding to image data that has been stored in a portable storage medium while being associated with print data for image formation; and an image formation unit which forms an image on a print medium based on print data that has been stored in the portable storage medium while being associated with image data corresponding to the image displayed by the display unit when printing is requested in regard to the image displayed by the display unit.

In the image formation device configured as above, when print data (for image formation) and image data (for display) have been stored in the portable storage medium while being associated with each other, the display unit displays an image corresponding to the image data stored in the portable storage medium. When printing is requested in regard to an image displayed by the display unit, the image formation unit forms an image on a print medium based on print data that has been stored in the portable storage medium while being associated with image data corresponding to the image displayed by the display unit.

Therefore, by previously storing image data of an image easily recognizable to the user in the portable storage medium as the image data associated with the print data, the user is allowed to easily and correctly make the check or selection of print data stored in the portable storage medium.

BRIEF DESCRIPTION OF THE ACCOMPANYING DRAWINGS

DETAILED DESCRIPTION OF THE EMBODIMENT

Figure 1:
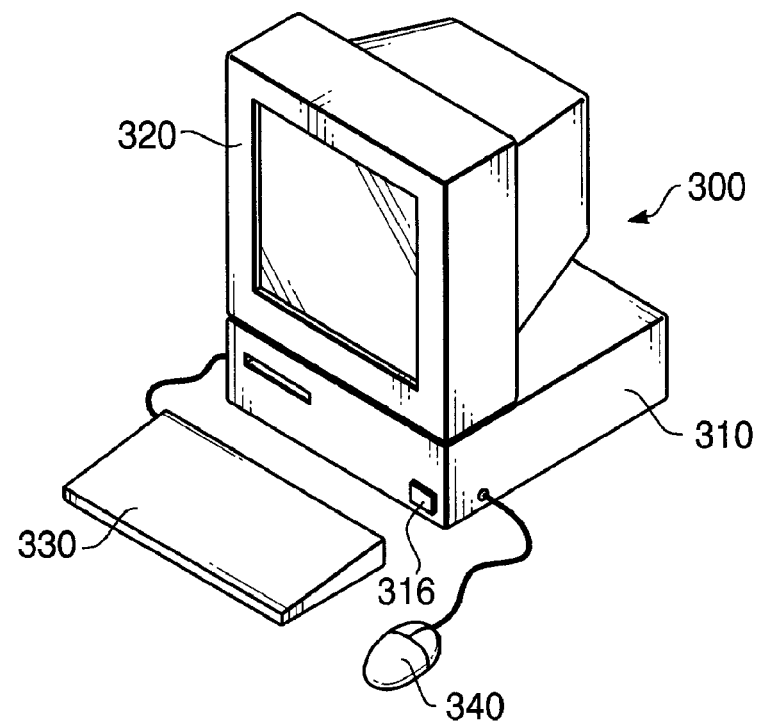
FIG. 1 is an external view showing the overall configuration of an image formation system in accordance with an embodiment of the present invention.
Figure 1:
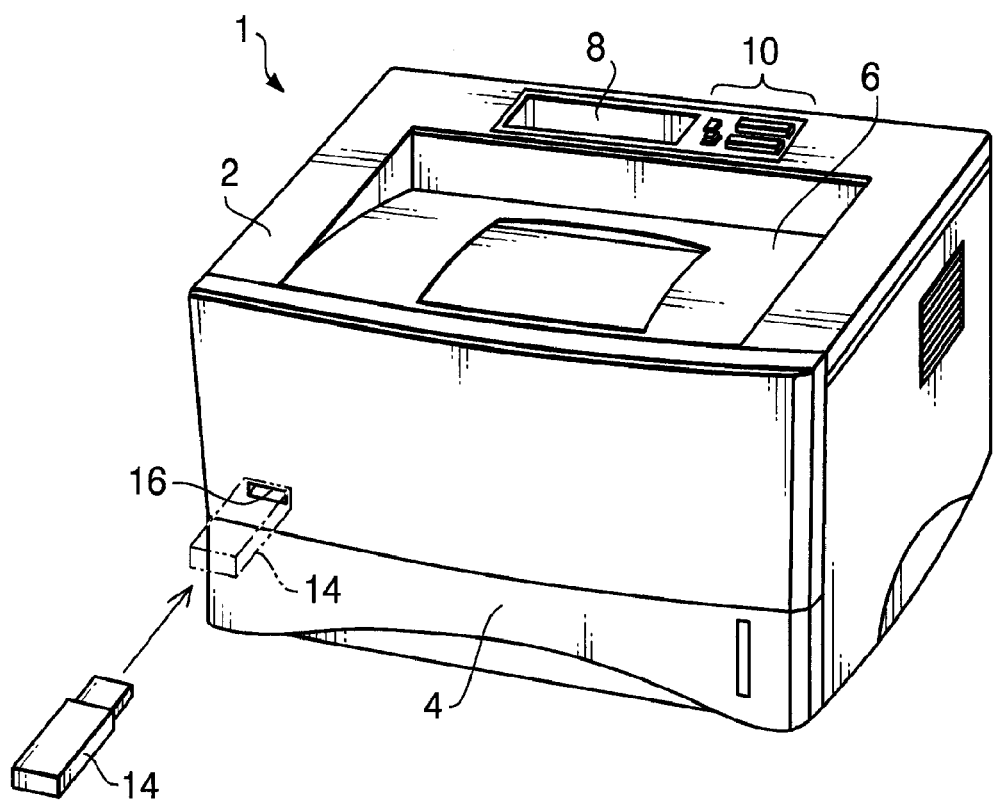

Referring now to the drawings, a description will be given in detail of a preferred embodiment in accordance with the present invention.

<Overall Configuration of Image Formation System>

FIG. 1 is an external view showing the overall configuration of an image formation system in accordance with an embodiment of the present invention. As shown in FIG. 1, the image formation system of this embodiment includes a printer 1 as an example of an image formation device and a personal computer 300 as an example of a data processing device. The printer 1 and the personal computer 300 are connected together by a network (LAN (Local Area Network), Internet, etc.).

As shown in FIG. 1, a sheet feed cassette 4 for storing unshown print media (e.g. paper) is placed in the lower part of the body 2 of the printer 1 so that it can be inserted and withdrawn. An output tray part 6, for receiving and holding print media after undergoing the printing process, is formed on the top of the body 2. The top of the body 2 is also provided with a display unit 8 (implemented by an LCD (Liquid crystal display), for example) for displaying information and an operation unit 10 for receiving various user operations (input operations) through various operation keys. The body 2 is also equipped with a slot 16 into which a USB memory 14 (as an example of a portable storage medium) can be inserted detachably.

Figure 2:
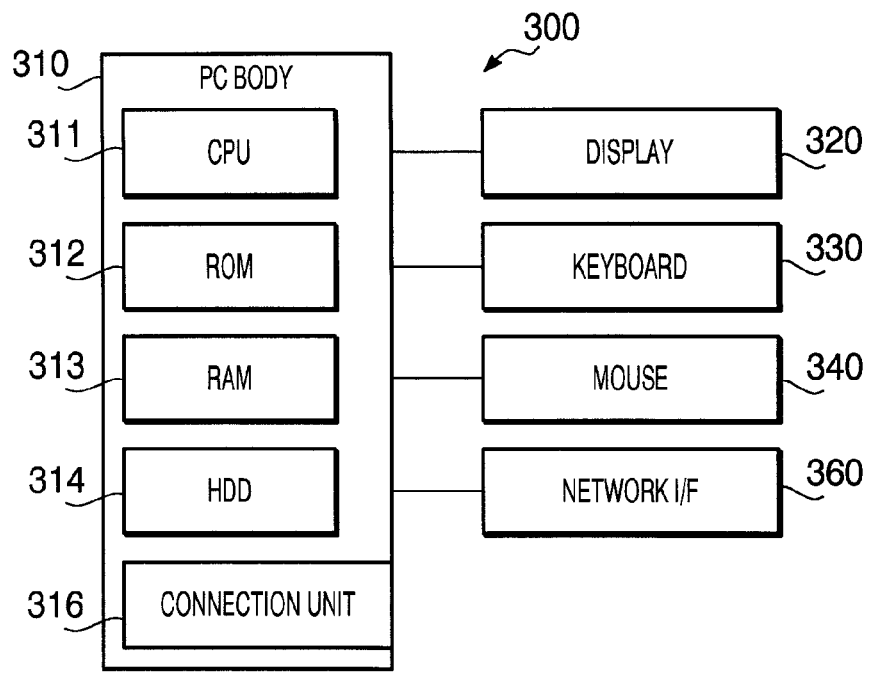
FIG. 2 is a block diagram showing the configuration of control systems of a personal computer and a printer included in the image formation system of FIG. 1.
Figure 2:
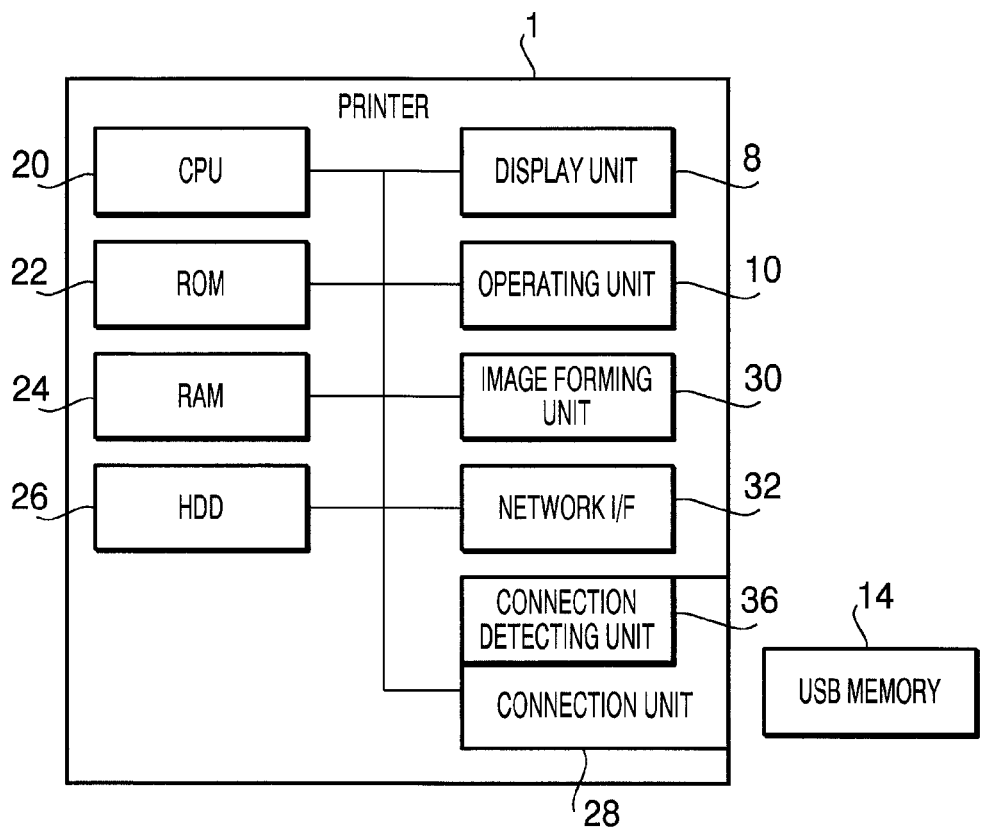

FIG. 2 is a block diagram showing the configuration of control systems of the personal computer 300 and the printer 1 of the image formation system.

The printer 1 includes a CPU (Central Processing Unit) 20 for executing processing programs, a ROM (Read Only Memory) 22 storing the processing programs and fonts for displaying characters, etc., a RAM (Random Access Memory) 24 for temporarily storing results of processing, etc., an HDD (Hard Disk Drive) 26 for storing data, etc., a connection unit 28 to which the USB memory 14 inserted into the slot 16 is electrically connected, the aforementioned display unit 8, the aforementioned operation unit 10, an image formation unit 30 for executing printing on print media under the control of a processing program, etc., and a network I/F (interface) 32 for the connection to the network. The connection unit 28 is equipped with a connection detecting unit 36 as a well-known unit for detecting whether a USB memory 14 has been attached to the slot 16 or not by monitoring a signal level of a terminal which stays in a conducting state (with a USB memory 14 attached to the slot 16) or in a non-conducting state (with no USB memory 14 attached to the slot 16).

The image formation unit 30 is configured to form a latent image on an unshown photosensitive drum by scanning a laser beam (modulated according to image data) on the photosensitive drum, form a toner image on the photosensitive drum by developing the latent image, transfer the toner image to a print medium fed from the sheet feed cassette 4, fix the transferred toner image, and eject the print medium with the fixed toner image to the output tray part 6. Incidentally, while the printer 1 in this embodiment is a page printer having the image formation unit 30 which forms a toner image on a photosensitive drum and transfers the toner image to a print medium as above, the type of the printer 1 is not particularly limited. For example, the printer 1 can also be an ink-jet serial printer.

The printer 1 forms the image data by expanding print data (stored in the USB memory 14) in a frame memory prepared in the RAM 24. The image data expanded in the frame memory of the RAM 24 is sent to the image formation unit 30 as CMYK data (K data in cases of gray-scale images) and thereby printed on a print medium such as paper. Incidentally, the printing process may either be color printing or monochrome printing. The print data stored in the USB memory 14 is PDL (Page Description Language) data or data described in a format allowing for the so-called "direct printing" (PDF, TIFF, JPEG, etc.), for example.

Meanwhile, the main body 310 of the personal computer 300 (hereinafter referred to as a "PC body 310") includes a CPU 311, a ROM 312, a RAM 313 and an HDD 314, as well as a connection unit 316 (see FIG. 1) to which the USB memory 14 can be connected. Connected to the PC body 310 are a display 320, a keyboard 330, a mouse 340 (as well-known PC components, see FIG. 1) and a network I/F (interface) 360 for the connection to the network.

Font data for alphanumeric characters, for non-alphanumeric characters and for some other characters and symbols are stored in the HDD 314.

<Process Executed by Personal Computer 300>

Figure 3:
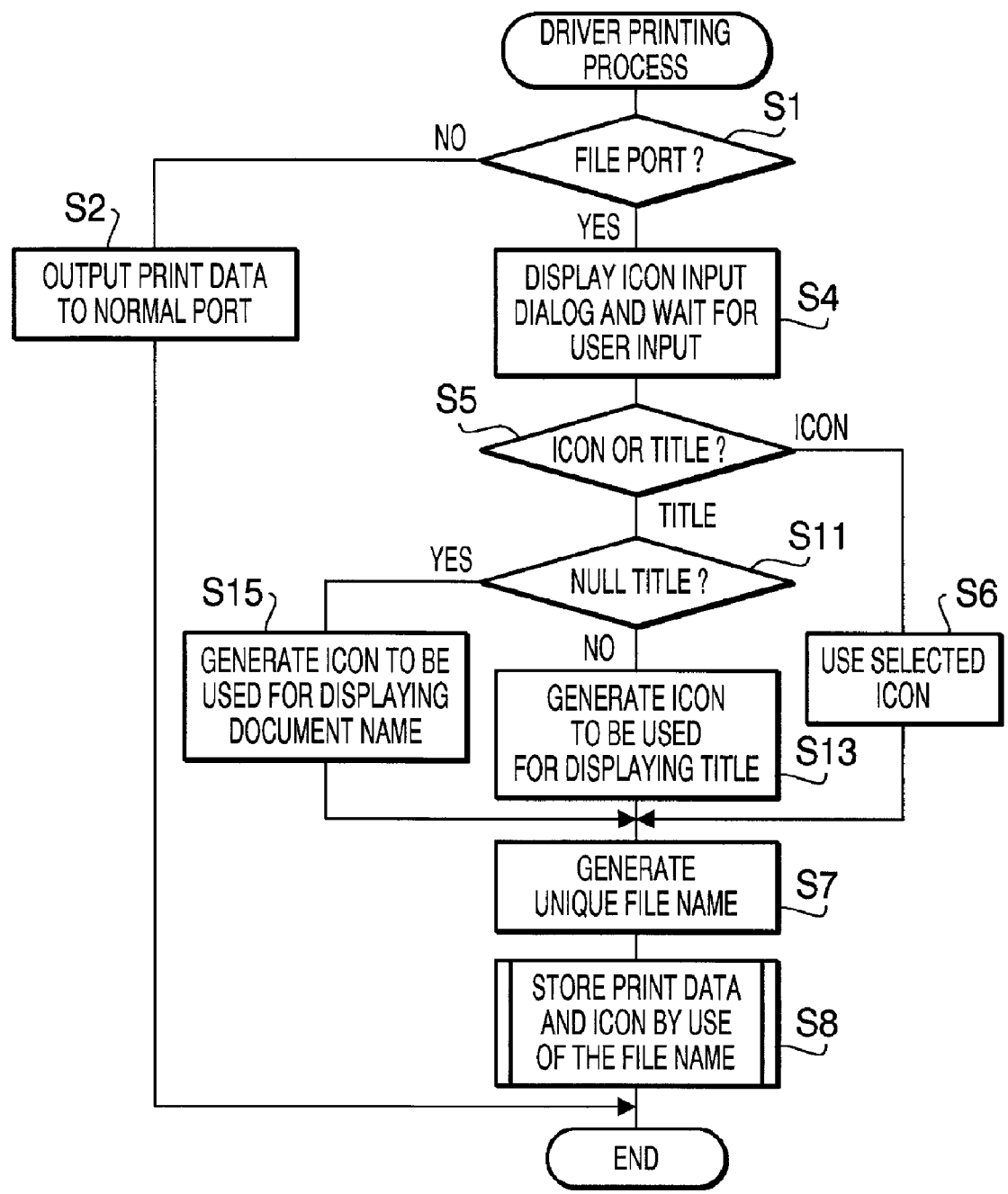
FIG. 3 is a flow chart showing a driver printing process which is executed by the personal computer in the image formation system.

In the following, processes executed in the image formation system will be described. First, FIG. 3 is a flow chart showing a driver printing process which is executed by the CPU 311 of the personal computer 300 according to a printer driver program stored in the HDD 314. The driver printing process of FIG. 3 is started when a "PRINT" button in a dialog of the printer driver (which is called up after an image to be printed is displayed on the display 320 by a well-known application, for example) is clicked by the user.

Referring to FIG. 3, at the start of the driver printing process, the CPU 311 judges whether or not a file port has been specified by the dialog as the destination of the print data (step S1). When the file port has not been specified as the destination of the print data, that is, when the local port or network port to which a printer is connected has been designated as the destination of the print data (S1: NO), the print data is outputted to a normal port such as the network I/F 32 (S2), by which the driver printing process of FIG. 3 is ended.

On the other hand, when the file port has been specified as the destination of the print data (S1: YES), the CPU 311 displays an icon input dialog 900 (see FIG. 4) on the display 320 and waits until a user input is made to the icon input dialog 900 (S4).

Figure 4:
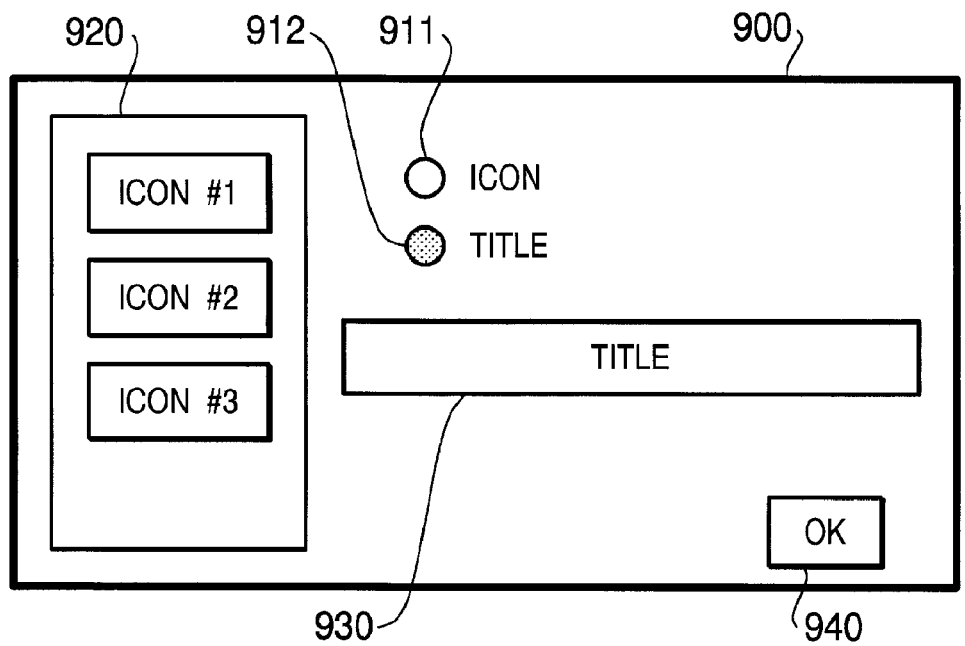
FIG. 4 is a schematic diagram showing an icon input dialog which is displayed in the driver printing process.

As shown in FIG. 4, the icon input dialog 900 includes check boxes 911 and 912 for letting the user select whether to specify an icon or a title for the print data, an icon display window 920 for displaying selectable icons when the check box 911 for specifying an icon has been clicked by the user, a title input window 930 for letting the user input a title when the check box 912 for specifying a title has been clicked by the user, and an "OK" button 940. User can select one of the check boxes 911 and 912. Incidentally, the title input window 930 is grayed out to be inoperable when the check box 911 (for specifying an icon) has been clicked, while the icon display window 920 is grayed out to be inoperable when the check box 912 (for specifying a title) has been clicked. In the step S4, the CPU 311 waits until the "OK" button 940 is clicked after the selection of an icon from the icon display window 920 (i.e. clicking on an icon) or the input of a title (no input is also OK) to the title input window 930.

Returning to FIG. 3, in the next step S5, the CPU 311 judges whether the user has specified an icon or a title based on the status of the check boxes 911 and 912 at the point when the "OK" button 940 was clicked. When an icon has been specified (S5: ICON), the CPU 311 specifies the icon selected from the icon display window 920 as the icon to be used for the print data (S6). Subsequently, the CPU 311 generates a unique file name by a well-known method (S7), stores the print data in the USB memory 14 by use of the generated file name while associating the file name with image data of the specified icon (S8), and ends the driver printing process of FIG. 3.

Figure 5:
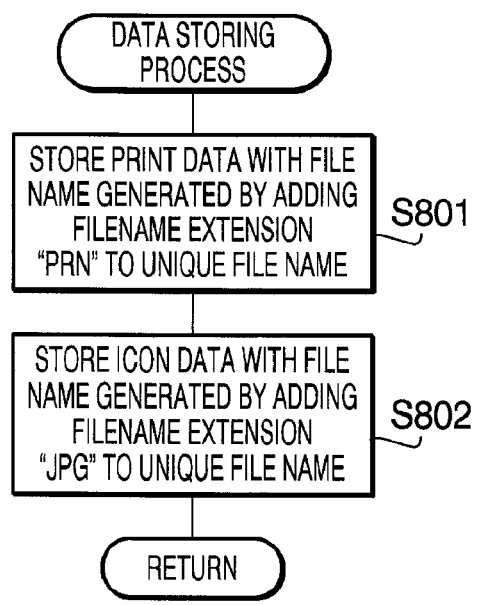
FIG. 5 is a flow chart showing the details of step S8 (data storing process) in FIG. 3.

FIG. 5 is a flow chart showing the details of the step S8 (data storing process) in FIG. 3. As shown in FIG. 5, in the first step S801, the CPU 311 stores the print data in the USB memory 14 with a file name that is generated by adding a filename extension "PRN" to the aforementioned unique file name (as an example of a job identifier). In the next step S802, the CPU 311 stores the image data of the specified icon (icon image data) in the USB memory 14 with a file name that is generated by adding a filename extension "JPG" to the unique file name, by which the data storing process of FIG. 5 is ended.

Returning to FIG. 3, when a title has been specified in the icon input dialog 900 in S5 (S5: TITLE), the process advances to step S11, in which the CPU 311 judges whether the title specified by the user is a null title or not, that is, whether the user inputted no character string to the title input window 930 or not. When the title is not a null title (S11: NO), the CPU 311 generates bitmap data (to be used for displaying the title) as icon image data (S13) and thereafter advances to the aforementioned step S7. The bitmap data includes images of title character string converted into image data by using font data stored in the HDD 314. In this case, the bitmap data to be used for displaying the title is stored in the USB memory 14 as the icon image data together with the print data by the aforementioned steps S7 and S8. Further, in this case, the printer 1 can display the title of the print data even if the printer 1 has no font data necessary for displaying the characters used in the title of the print data. Optionally, the bitmap data may include a reduced image of the first page of the print data.

On the other hand, when the title specified by the user is judged to be a null title in S11 (S11: YES), the CPU 311 generates bitmap data (to be used for displaying a document name which has been set by an application, etc.) as icon image data (S15) and thereafter advances to the aforementioned step S7. In this case, the bitmap data to be used for displaying the document name is stored in the USB memory 14 as the icon image data together with the print data by the aforementioned steps S7 and S8.

<Process Executed by Printer 1>

Figure 6:
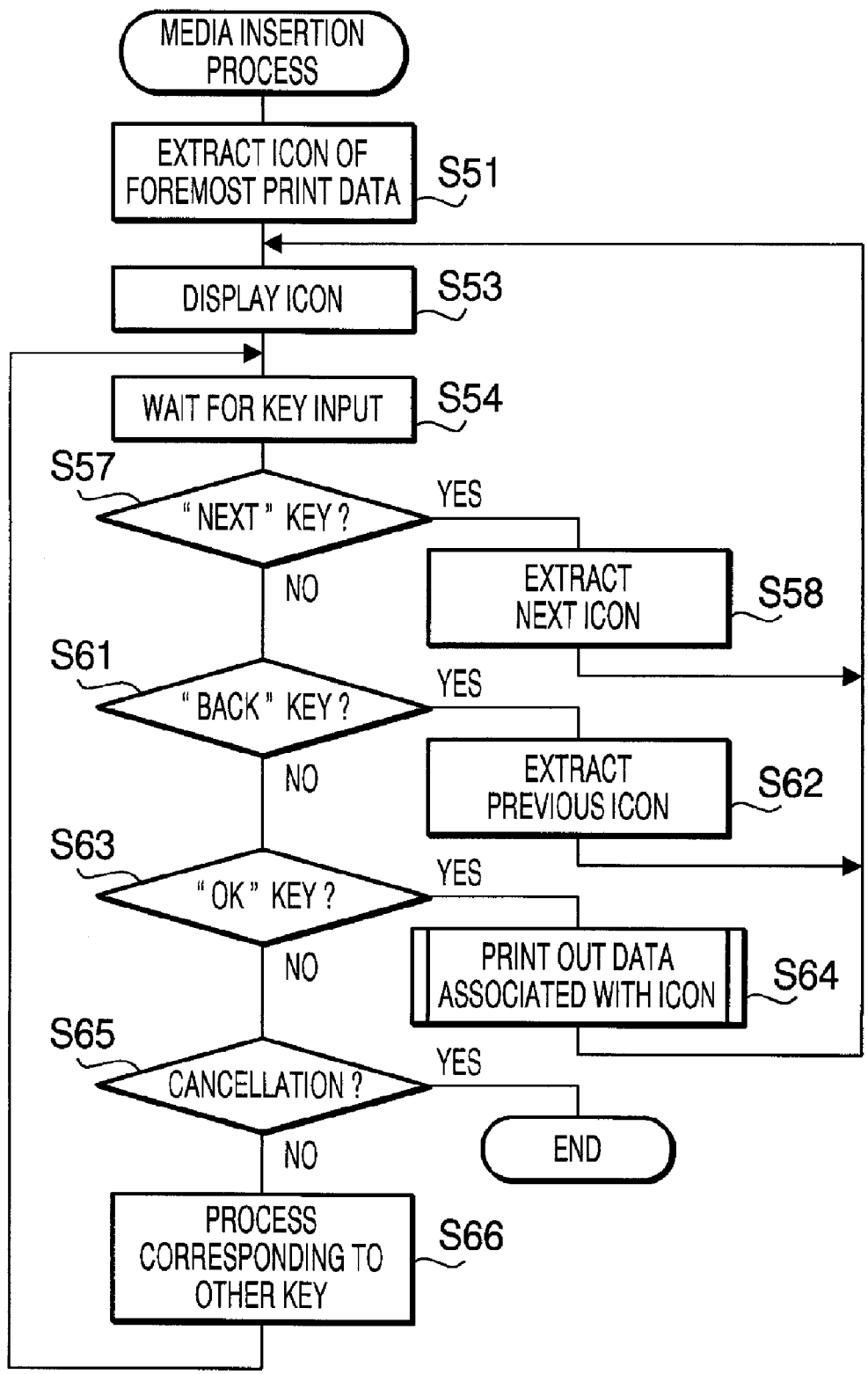
FIG. 6 is flow chart showing a storage medium insertion process which is executed by the printer in the image formation system.

FIG. 6 is flow chart showing a storage medium insertion process which is executed by the printer 1 when the USB memory 14 (which has stored the print data and the icon image data as above) is inserted into the slot 16, that is, connected to the connection unit 28. The storage medium insertion process of FIG. 6 is executed by the CPU 20 according to a program stored in the ROM 22.

Referring to FIG. 6, at the start of the storage medium insertion process, the CPU 20 reads out (extracts) all of icon image data stored in the USB Memory 14 that have been associated with the foremost print data in the USB memory 14 (having the newest date/time of update, for example) from the USB memory 14 (S51). Subsequently, the CPU 20 displays the icon image on the display unit 8 based on the extracted icon image data (S53) and waits until a key input is made by the user to the operation unit 10 (S54). Although not shown in FIGS. 1 and 2, the operation unit 10 at least includes a "NEXT" key and a "BACK" key (represented by arrows), an "OK" key, and a "CANCEL" key.

When a key of the operation unit 10 is pressed by the user, the process advances from the step S54 to step S57, in which the CPU 20 judges whether the key pressed in the waiting state of S54 is the "NEXT" key or not. When the pressed key is the "NEXT" key (S57: YES), the CPU 20 extracts icon image data that has been associated with the next print data in the USB memory 14 from the USB memory 14 (S58) and thereafter returns to the step S53. In the step S53, an icon image is displayed on the display unit 8 based on the extracted icon image data instead of the currently displayed icon image. Thereafter, the CPU 20 shifts to the waiting state of S54.

When the pressed key is not the "NEXT" key in S57 (S57: NO), the CPU 20 judges whether the key pressed in the waiting state of S54 is the "BACK" key or not (S61). When the pressed key is the "BACK" key (S61: YES), the CPU 20 extracts icon image data that has been associated with the previous print data in the USB memory 14 from the USB memory 14 (S62) and thereafter returns to the step S53. In the step S53, an icon image is displayed on the display unit 8 based on the extracted icon image data instead of the currently displayed icon image. Thereafter, the CPU 20 shifts to the waiting state of S54.

When the pressed key is not the "NEXT" key or the "BACK" key in S61 (S57: N0, S61: NO), the CPU 20 judges whether the key pressed in the waiting state of S54 is the "OK" key or not (S63). When the pressed key is the "OK" key (S63: YES), the CPU 20 prints out the print data associated with the icon (icon image) currently displayed on the display unit 8 (S64). Thereafter, the process returns to the step S53. In this case, the icon currently displayed on the display unit 8 is not changed by the step S53. However, the display unit 8 in this case may also be used for displaying other information representing the progress of the printing.

Figure 7:
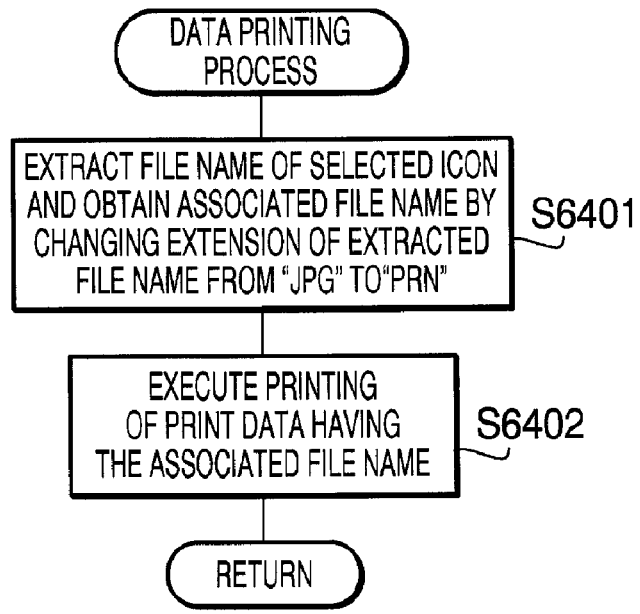
FIG. 7 is a flow chart showing the details of step S64 (data printing process) in FIG. 6.

FIG. 7 is a flow chart showing the details of the step S64 (data printing process) in FIG. 6. As shown in FIG. 7, in the first step S6401, the CPU 20 extracts the file name of the selected icon (i.e. the file name of the icon image data being displayed on the display unit 8 at the point of the shift to the data printing process) and obtains an associated file name by changing the extension of the extracted file name from "JPG" to "PRN". In the next step S6402, the CPU 20 makes the image formation unit 30 execute printing (image formation) on a print medium based on print data having the associated file name obtained in the step S6401. Thereafter, the process returns to the step S53 in FIG. 6.

Returning to FIG. 6, when the key pressed in the waiting state of S54 is not the "NEXT" key, the "BACK" key or the "OK" key in S63 (S57: N0, S61: N0, S63: NO), the CPU 20 judges whether "cancellation" has been made or not (S65). The "cancellation" includes not only the pressing of the "CANCEL" key but also extraction of the USB memory 14 from the slot 16. When the cancellation has been made (S65: YES), the storage medium insertion process of FIG. 6 is ended immediately. When no cancellation has been made (S65: NO), the CPU 20 executes a process corresponding to the key input (other key input) made in the waiting state of S54 (S66) and thereafter shifts to the waiting state of S54.

As described above, in the image formation system of this embodiment, the personal computer 300 generates the icon image data corresponding to the icon selected by the user (S6), the title inputted by the user (S13) or the document name as an example of the identifier of the print job (S15), and stores the generated icon image data in the USB memory 14 while associating it with the print data. The USB memory 14 (storing one or more pairs of print data and icon image data associated with each other) is inserted into the slot 16 of the printer 1. The printer 1 is capable of letting the user select print data that should be printed out (S57-S63) while displaying the image of each icon on the display unit 8 based on the icon image data stored in the USB memory 14 (S53). Thus, with the image formation system of this embodiment, the user is allowed to make the check and selection of print data (that should be printed out) on the printer 1 side correctly and with ease.

<Modifications of Embodiment>

While a description has been given above of a preferred embodiment in accordance with the present invention, the present invention is not to be restricted by the particular illustrative embodiment and a variety of modifications, design changes, etc. are possible without departing from the scope and spirit of the present invention described in the appended claims.

For example, the association between print data and icon image data can be made by various other methods, and the data storing process and the data printing process described above can be modified as below depending on the associating method.

Figure 8:
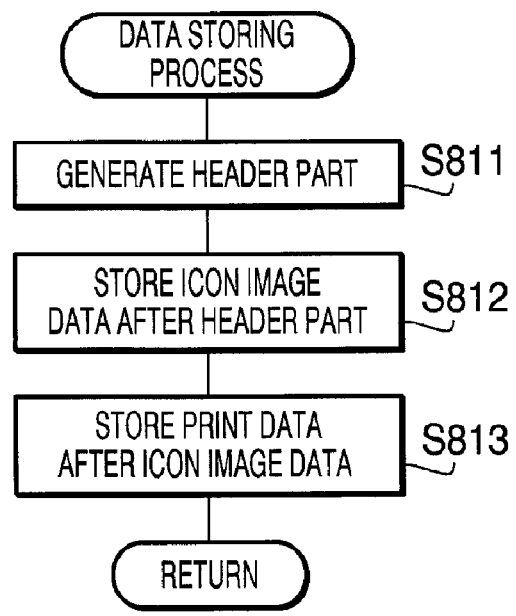
FIG. 8 is a flow chart showing a modification of the data storing process.
Figure 9:
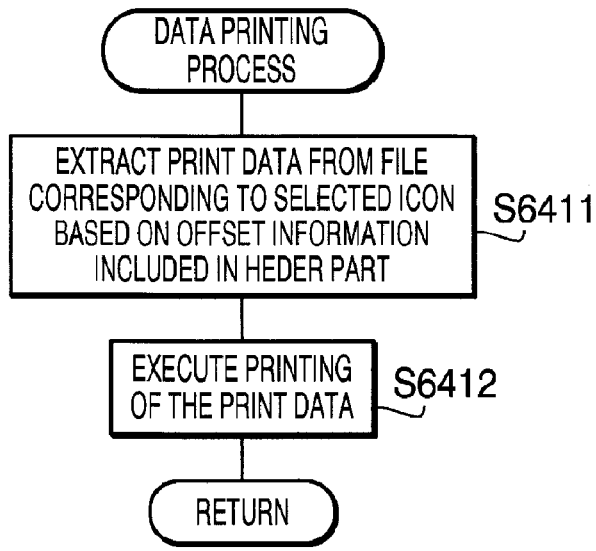
FIG. 9 is a flow chart showing a modification of the data printing process.

As an example (modification) of the associating method, print data and icon image data (to be associated with the print data) can be integrated into one file. In this case, the data storing process and the data printing process are modified as shown in FIGS. 8 and 9. In the data storing process of FIG. 8, the CPU 311 of the personal computer 300 first generates a header part which includes offset information indicating the starting position of the print data in the file (S811). The offset information is calculated by using the size of the header and the size of the icon data. Subsequently, the CPU 311 stores the icon image data after the header part (S812) and thereafter stores the print data after the icon image data (S813), by which the file integrating the print data and the icon image data is formed (stored) in the USB memory 14 and the data storing process of FIG. 8 is ended. In the data storing process of FIG. 8, the header part, the icon data and the print data are stored in the file in this order.

In the data printing process of FIG. 9 corresponding to the data storing process of FIG. 8, the CPU 20 of the printer 1 extracts the print data from a file corresponding to the selected icon (i.e. from a file storing the icon image data displayed on the display unit 8 when the "OK" key was pressed by the user) based on the offset information included in the header part of the file (S6411), executes the printing according to the extracted print data (S6412), and thereafter returns to the step S53 in FIG. 6.

In this example, the header part and the icon image data part may also be embedded in a part of the print data that is handled as a comment in the grammar of PDL or PJL. With such data structure, the print data containing the icon image data can be printed out normally by other printers supporting the same PDL and not having the configuration according to the present invention.

As for the order of data arrangement in the file, placing the print data in front of the icon image data as in this example is advantageous in that the first print can be obtained quickly in the printing process. However, it is also possible to increase the response speed of the printer 1 for the file selection, by placing the icon image data in front of the print data.

Figure 10:
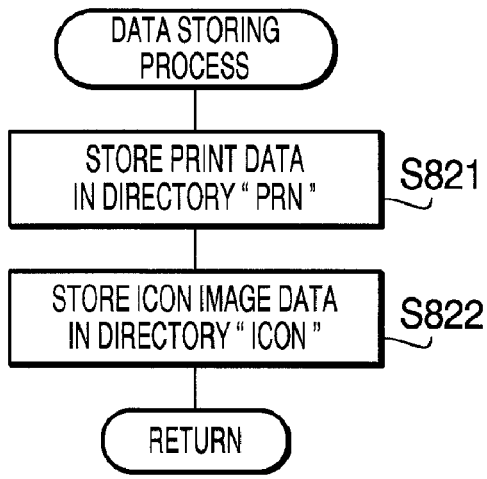
FIG. 10 is a flow chart showing another modification of the data storing process.

As another example (modification) of the associating method, print data and icon image data (to be associated with the print data) may be associated with each other not by changing the filename extension but by storing the print data and the icon image data in different directories (e.g. different folders) while making the association by use of a common unique file name (as the job identifier) for both the print data and the icon image data similarly to the above embodiment (FIG. 5, FIG. 7). FIG. 10 is a flow chart showing the data storing process employed in this example. In this example, the USB memory 14 is assumed to have two directories "PRN" and "ICON" under the root directory. The CPU 311 of the personal computer 300 stores the print data (having the unique file name) in the directory "PRN" (S821) while storing the icon image data (having the same file name) in the directory "ICON" (S822), by which the data storing process of FIG. 10 is ended.

In cases where the USB memory 14 does not have the directories "PRN" and "ICON" at the start of the data storing process of FIG. 10, the storing of the print data and the icon image data in S821 and S822 is carried out after creating the directories "PRN" and "ICON". While the same file name is given to the print data and the icon image data stored in the directories "PRN" and "ICON" in this example, it is also possible to give a suitable filename extension to either or both of the print data and the icon image data.

Figure 11:
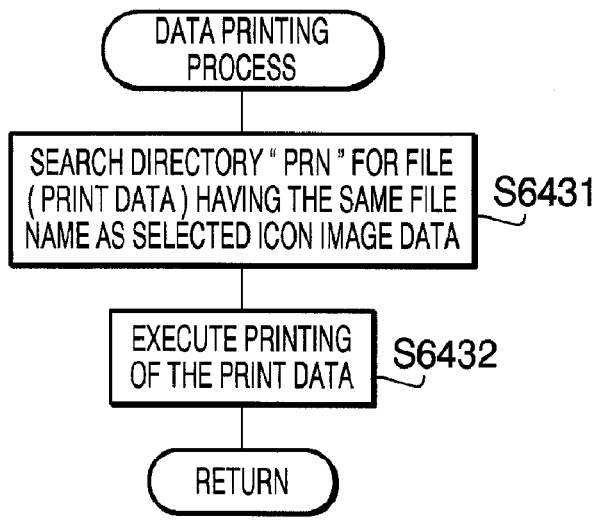
FIG. 11 is a flow chart showing another modification of the data printing process.

FIG. 11 is a flow chart showing the data printing process (corresponding to the data storing process of FIG. 10) employed in this example. The CPU 20 of the printer 1 searches the directory "PRN" for a file (print data) having the same file name as the selected icon image data (S6431), executes the printing according to the print data found in S6431 (S6432), and thereafter returns to the step S53 in FIG. 6. While there exists still another method for associating print data with icon image data (by storing the print data and the icon image data in the same directory), the method will be explained later.

Figure 12:
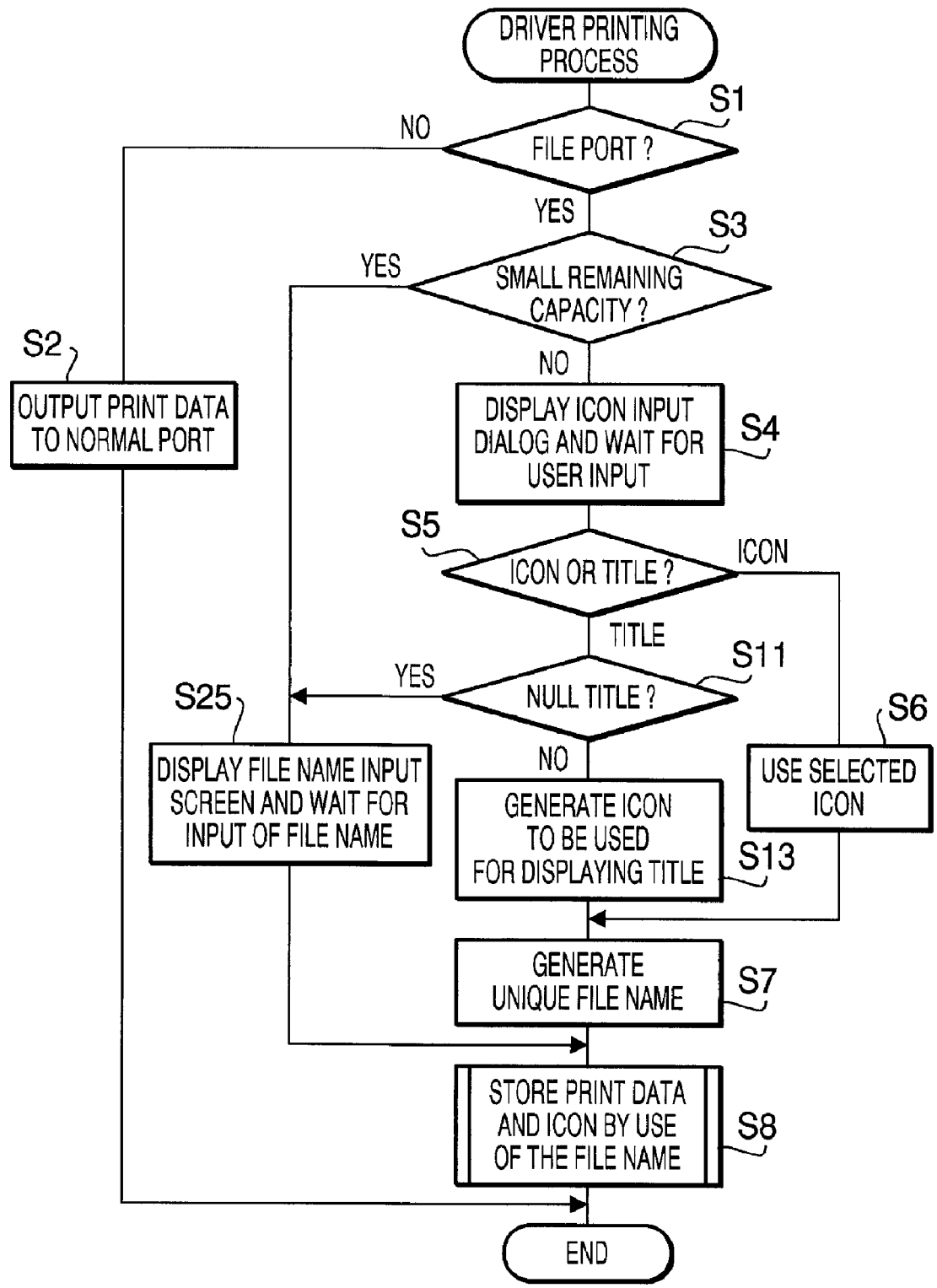
FIG. 12 is a flow chart showing a modification of the driver printing process.

FIG. 12 is a flow chart showing a modification of the driver printing process. As shown in FIG. 12, the storing of the icon image data in the USB memory 14 may be canceled when the remaining capacity of the USB memory 14 is small. The driver printing process of FIG. 12 differs from that of FIG. 3 in that a step S3 is inserted between the steps S1 and S4 in FIG. 3 and a step S25 is executed instead of the step S15 in FIG. 3. Since the other steps are the same as those in FIG. 3, only the difference from FIG. 3 will be described below.

As shown in FIG. 12, when the file port has been specified as the destination of the print data (S1: YES), the CPU 311 of the personal computer 300 judges whether the remaining capacity of the USB memory 14 attached to the connection unit 316 is small (i.e. less than a threshold capacity) or not (S3). The process advances to the aforementioned step S4 only when the USB memory 14 has a sufficient remaining capacity (S3: NO). When the remaining capacity of the USB memory 14 is small (S3: YES), the process advances to the step S25, in which the CPU 311 displays a file name input screen (for letting the user input a file name of the print data) on the display 320 and waits until the file name input by the user is completed. Upon completion of the file name input, the process advances to the aforementioned step S8, by which the print data is stored in the USB memory 14 with the file name inputted by the user in S25. In this case, only the print data is stored in the USB memory 14 in S8 since no icon image data has been generated for the print data.

Also when a title specified in the icon input dialog 900 is a null title (S11: YES), the process advances to the step S25 and only the print data is stored in the USB memory 14 with the file name inputted by the user in S25 (S8). Thus, in cases where the capacity of the USB memory 14 is small (S3: YES) or the user intentionally specifies no title in the icon input dialog 900 (S11: YES), the user can give a desired file name to the print data instead of generating the icon image data for the print data, by which a memory full error of the USB memory 14 can be prevented effectively.

Figure 13:
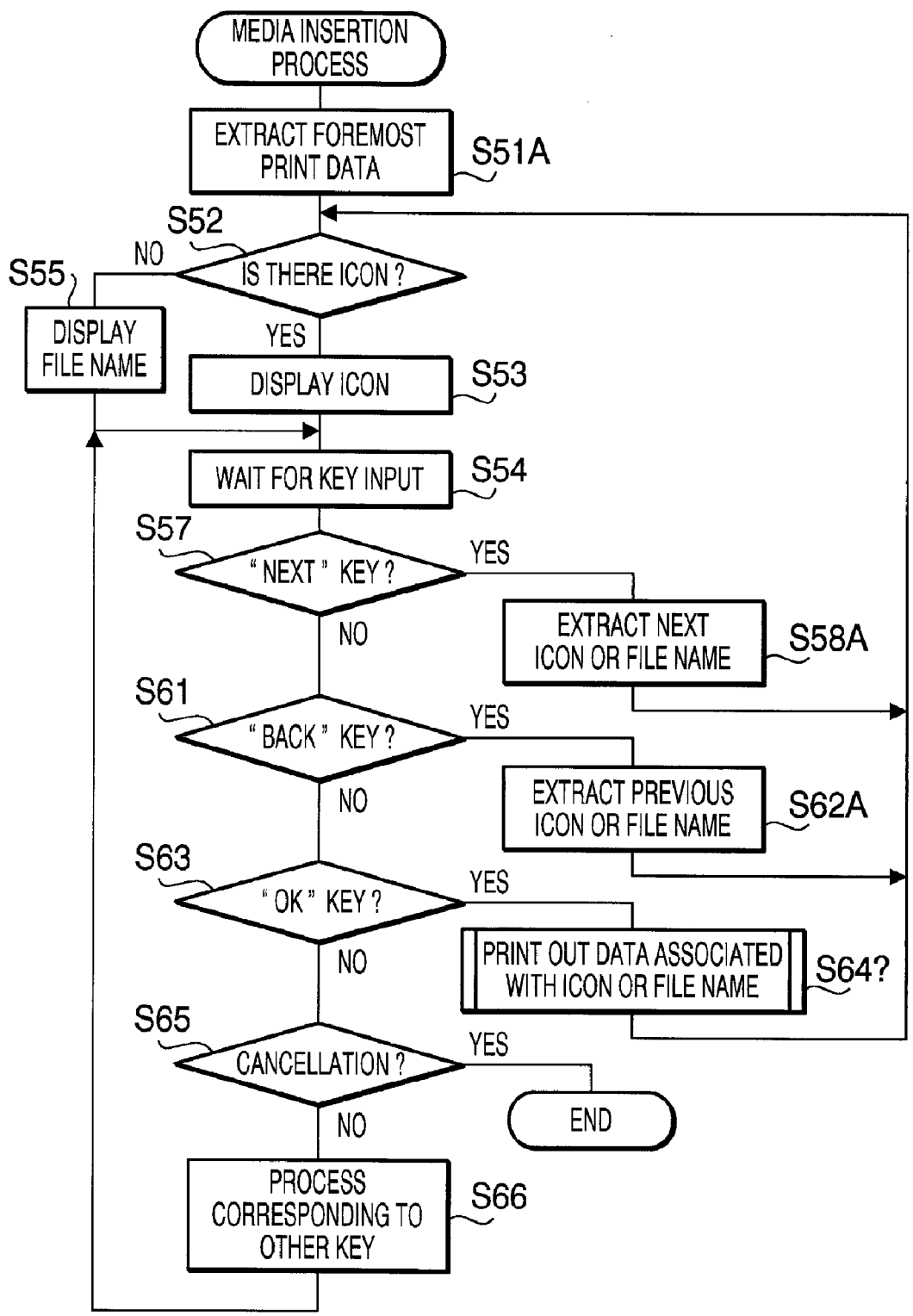
FIG. 13 is a flow chart showing a modification of the storage medium insertion process (corresponding to the driver printing process of FIG. 12)

FIG. 13 is a flow chart showing a modification of the storage medium insertion process (corresponding to the driver printing process of FIG. 12) employed in this example. The storage medium insertion process of FIG. 13 differs from that of FIG. 6 in that the steps S51, S58 and S62 in FIG. 6 are replaced with steps S51A, S58A and S62A and extra steps S52 and S55 are added.

Since not every piece of print data stored in the USB memory 14 has necessarily been associated with icon image data in this example, the CPU 20 of the printer 1 extracts the foremost print data from the USB memory 14 in the step S51A replacing the step S51. Subsequently, the CPU 20 judges whether there exists icon image data associated with the print data or not (S52). When icon image data associated with the print data is found (S52: YES), the process advances to the aforementioned step S53 and the image of the icon is displayed on the display unit 8 based on the icon image data. On the other hand, when there exists no icon image data associated with the print data (S52: NO), the file name of the print data is displayed on the display unit 8 (S55). After the step S53 or S55, the process advances to the aforementioned step S54.

If there is not enough remaining capacity for extracting the icon data in the USB memory 14, the CPU 20 may delete all the existing icon data associated with the print data.

Also in the step S58A which is executed when the "NEXT" key is pressed (S57: YES), the CPU 20 extracts icon image data associated with the next print data from the USB memory 14 only when such icon image data is found (while extracting the file name of the next print data when there exists no such icon image data in the USB memory 14) and thereafter advances to the step S52. Similarly, in the step S62A which is executed when the "BACK" key is pressed (S61: YES), the CPU 20 extracts icon image data associated with the previous print data from the USB memory 14 only when such icon image data is found (while extracting the file name of the previous print data when there exists no such icon image data in the USB memory 14) and thereafter advances to the step S52. Therefore, an icon image or a file name is displayed on the display unit 8 depending on the presence/absence of the associated icon image data in the USB memory 14, and the user can make the selection of the print data (that should be printed out) based on the display.

Figure 14:
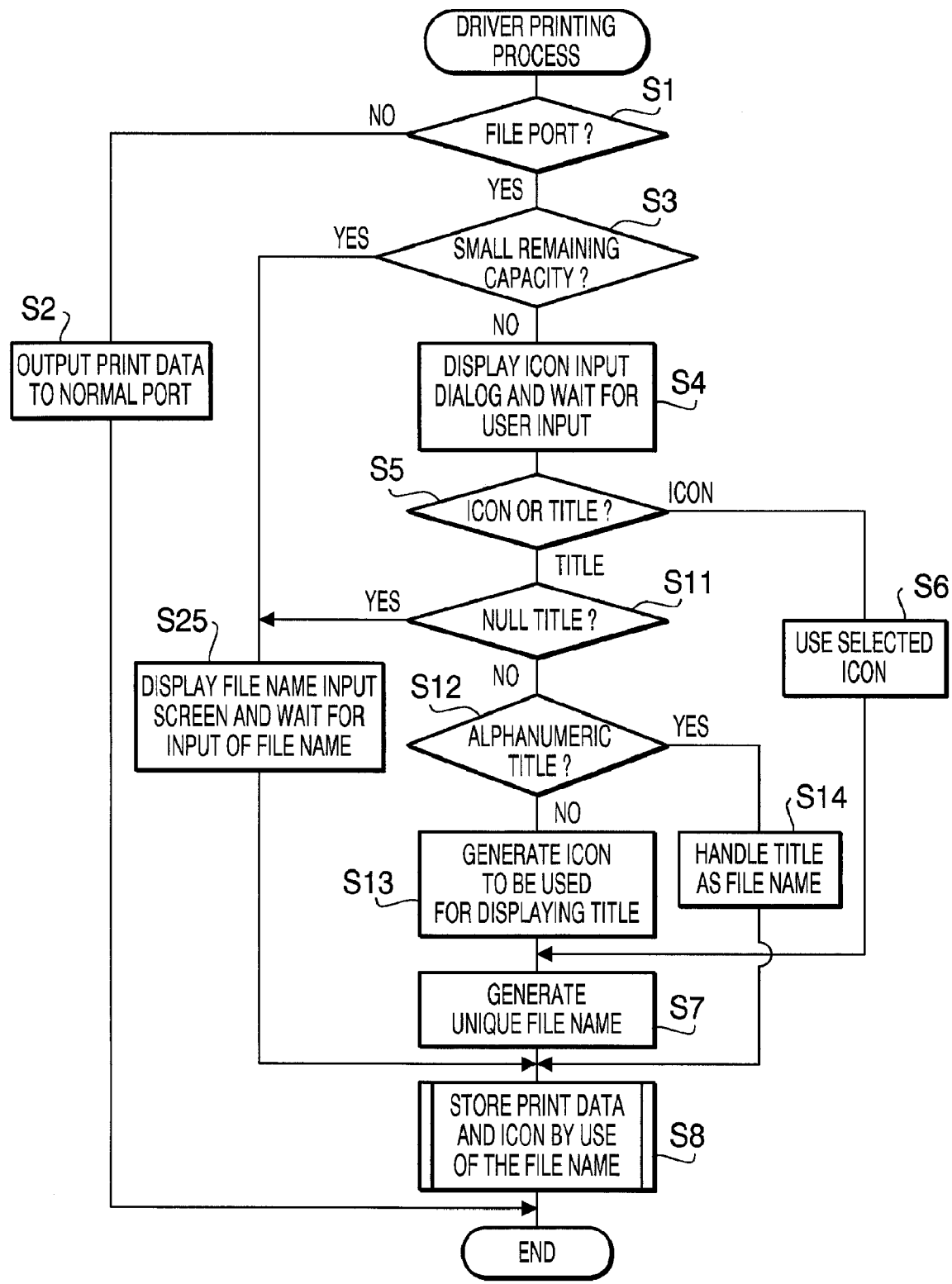
FIG. 14 is a flow chart showing another modification of the driver printing process.

Another modification of the driver printing process will be described below. Even when a title that is not a null title has been specified in the icon input dialog 900 (S11: NO), the probability of garbled characters is low and the necessity of generating the icon image data by bitmapping the characters is also low in cases where the specified title is made up of alphanumeric characters only. Therefore, the driver printing process (modification) of FIG. 12 can be further modified as shown in FIG. 14. The difference from the driver printing process of FIG. 12 is that a step S12 is inserted between the steps S11 and S13 and an extra step S14 is added. Since the other steps are the same as those in FIG. 12, only the difference from FIG. 12 will be described below.

As shown in FIG. 14, when the specified title is not a null title (S11: NO), the CPU 311 of the personal computer 300 judges whether or not the title is made up of alphanumeric characters only (S12). When the title is not made up of alphanumeric characters only, that is, when the title includes a non-alphanumeric character (kanji character, Japanese syllabary character, etc.) (S12: NO), the process advances to the aforementioned step S13 and the icon image data to be used for displaying the title is generated. On the other hand, when the title includes alphanumeric characters only (S12: YES), the process advances to the step S14. In this case, the CPU 311 executes a process for handling the title as the file name (S14) and thereafter advances to the aforementioned step S8.

In this driver printing process of FIG. 14, the result of inputting an alphanumeric title (made up of alphanumeric characters only) to the title input window 930 of the icon input dialog 900 is substantially equal to the result of inputting the alphanumeric title to the file name input screen displayed in S25. With this process, limited capacity of the USB memory 14 can be utilized more efficiently by handling alphanumeric titles (having low necessity of bitmapping) just as the file names.

Figure 15:
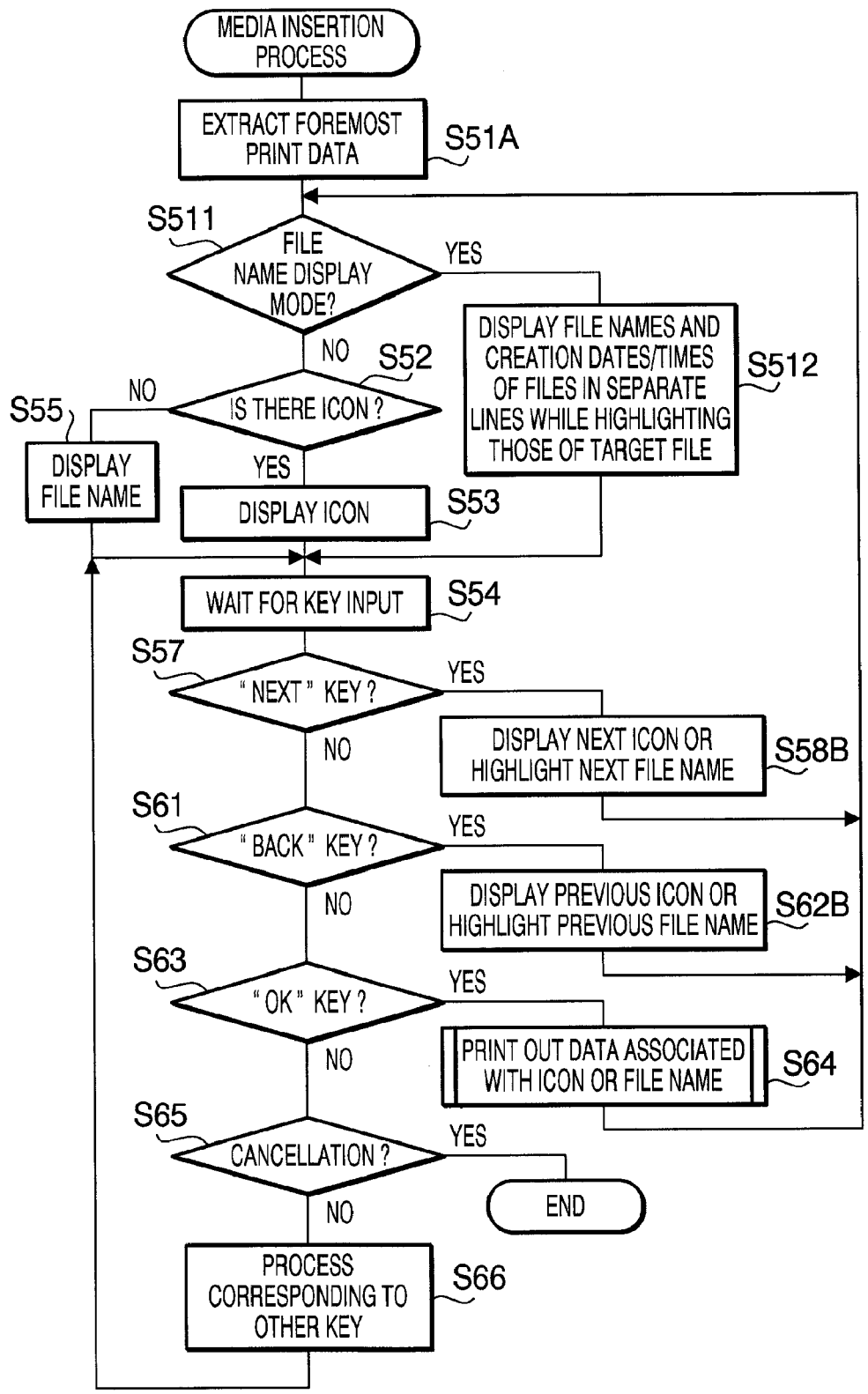
FIG. 15 is a flow chart showing another modification of the storage medium insertion process.

Incidentally, while only one icon or file name is displayed at a time on the display unit 8 of the printer 1 in the above embodiment and modifications, it is also possible to display multiple file names in separate lines on the display unit 8. Therefore, the storage medium insertion process (modification) of FIG. 13 can be further modified as shown in FIG. 15. The storage medium insertion process of FIG. 15 differs from that of FIG. 13 in that the steps S58A and S62A in FIG. 13 are replaced with steps S58B and S62B, a step S511 is inserted between the steps S51A and S52, and an extra step S512 is added. Since the other steps are the same as those in FIG. 13, only the difference from FIG. 13 will be described below.

As shown in FIG. 15, after extracting the foremost print data from the USB memory 14 (S51A), the CPU 20 of the printer 1 judges whether its operation mode has been set to a file name display mode or not (S511). When the operation mode is not the file name display mode (S511: NO), the CPU 20 advances to the aforementioned step S52 and executes the subsequent process similarly to FIG. 13. When the operation mode is the file name display mode (S511: YES), the process advances to the step S512, in which the CPU 20 displays file names and creation dates/times of multiple files (multiple pieces of print data stored in the USB memory 14) in separate lines (corresponding to the files) on the display unit 8. In this step S512, the file name and creation dates/time of a "target file" (at first, the file of the foremost print data extracted in S51A) are highlighted. Thereafter, the process advances to the aforementioned step S54.

In the step S58B which is executed when the "NEXT" key is pressed (S57: YES), the CPU 20 displays the icon of the next print data (or the file name of the next print data when there is no icon for the next print data) when the operation mode is not the file name display mode, while highlighting the file name of the next print data when the operation mode is the file name display mode. Thereafter, the process returns to the step S511. Similarly, in the step S62B which is executed when the "BACK" key is pressed (S61: YES), the CPU 20 displays the icon of the previous print data (or the file name of the previous print data when there is no icon for the previous print data) when the operation mode is not the file name display mode, while highlighting the file name of the previous print data when the operation mode is the file name display mode. Thereafter, the process returns to the step S511. Incidentally, in the storage medium insertion process of FIG. 15, the display on the display unit 8 is just continued when the process returns to the step S511 and thereafter advances to the step S53, S55 or S512 since the displaying of the icon or the highlighting of the file name has already been carried out in S58B or S62B.

In the above case where multiple file names are simultaneously displayed on the display unit 8 in the file name display mode (S512), the user can make the selection of the print data (that should be printed out) with greater ease by previously giving each piece of print data a file name that is easily recognizable to the user, as well as by viewing the file creation dates/times displayed together with the file names.

Figure 16:
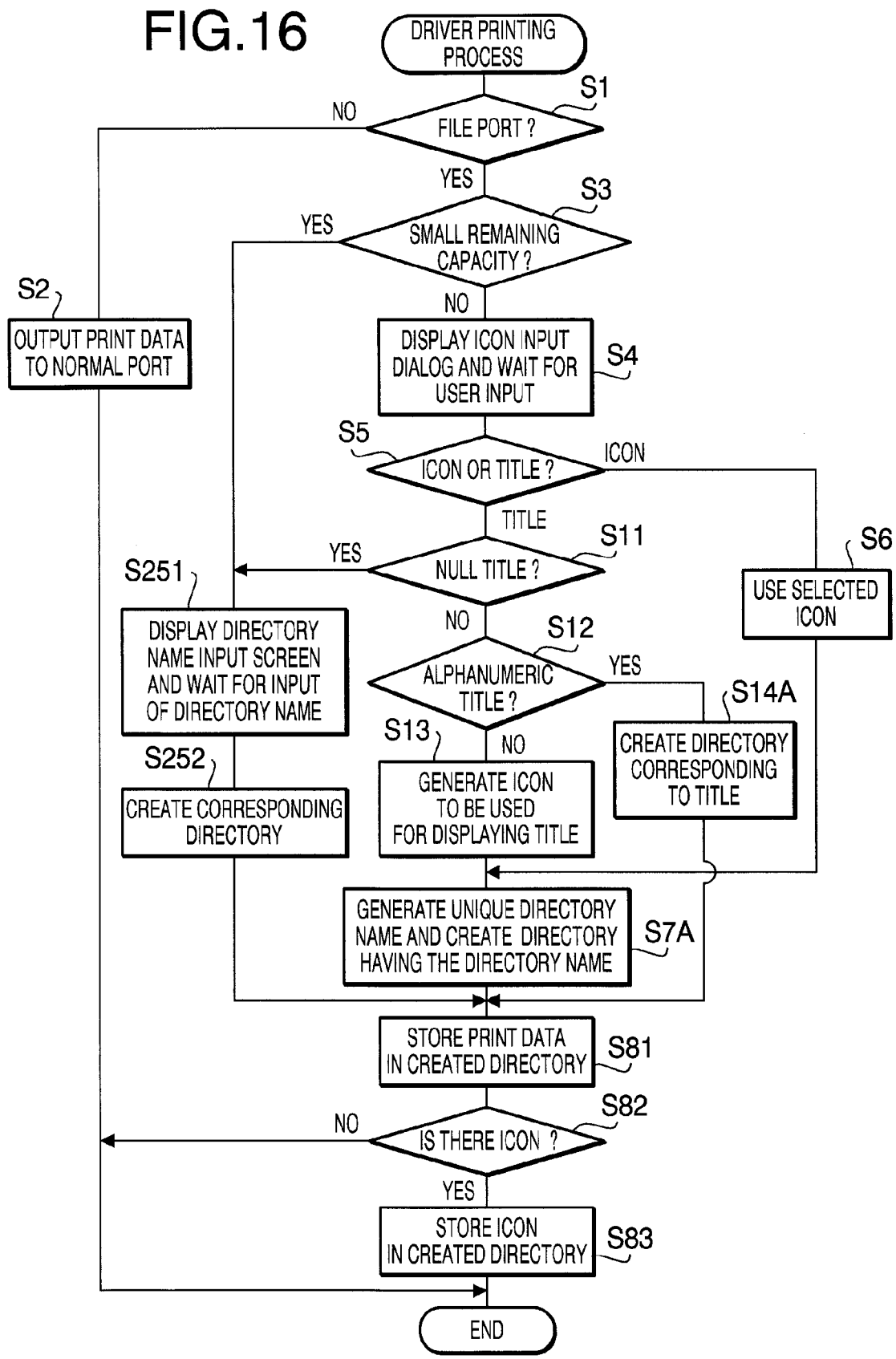
FIG. 16 is a flow chart showing still another modification of the driver printing process.

Next, the aforementioned "still another method" for associating print data with icon image data (by storing the print data and the icon image data in the same directory) will be explained. FIG. 16 is a flow chart showing the driver printing process for implementing the associating method. The driver printing process of FIG. 16 differs from that of FIG. 14 in that the steps S7 and S14 in FIG. 14 are replaced with steps S7A and S14A, the step S25 in FIG. 14 is replaced with steps S251 and S252, and the step S8 in FIG. 14 is replaced with steps S81-S83. Since the other steps are the same as those in FIG. 14, only the difference from FIG. 14 will be described below.

As shown in FIG. 16, the CPU 311 in the step S7A generates a unique directory name and creates a directory having the unique directory name, instead of generating a unique file name as in the step S7 in FIG. 14. Subsequently, the CPU 311 stores the print data in the created directory (S81) and judges whether there exists an icon (icon image data) corresponding to the print data (S82). When there exists an icon corresponding to the print data (S82: YES), the CPU 311 stores the icon image data in the created directory (S83) and ends the driver printing process of FIG. 16. When there exists no icon corresponding to the print data (S82: NO), the CPU 311 ends the driver printing process with no further operation.

In the step S14A replacing the step S14 in FIG. 14, the CPU 311 creates a directory corresponding to the alphanumeric title and thereafter advances to the step S81. In the steps S251 and S252 replacing the step S25 in FIG. 14, the CPU 311 waits until a directory name is inputted by the user to a directory name input screen (S251), creates a directory corresponding to the inputted directory name (S251), and thereafter advances to the step S81.

By the driver printing process of FIG. 16, print data and icon image data corresponding to each other (that is, to be associated with each other) are stored in the same directory (S81, S83). When there exists no icon corresponding to the print data, only the print data is stored in a directory corresponding to the title or the inputted directory name (S14A, S251, S252, S81).

Figure 17:
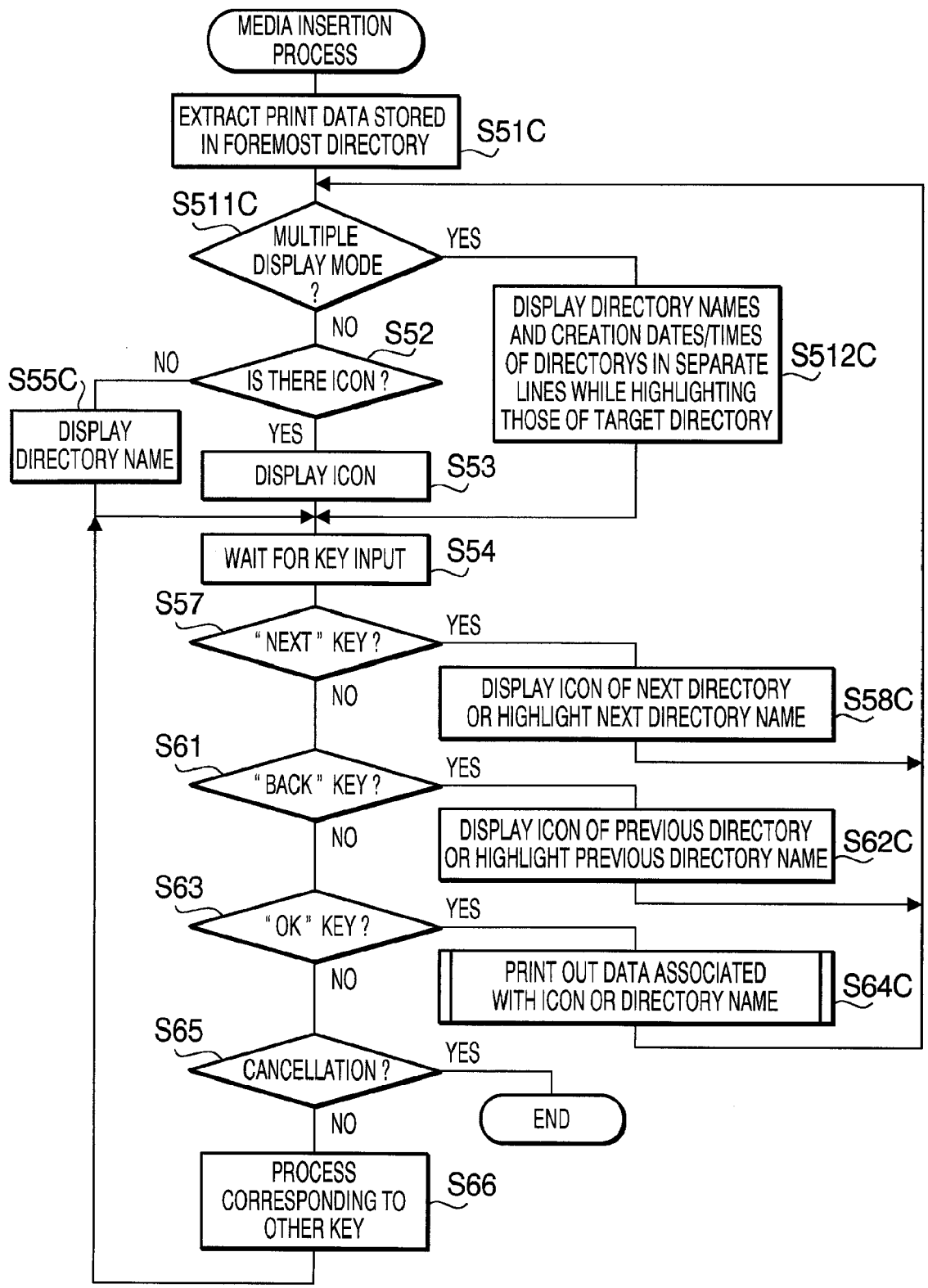
FIG. 17 is a flow chart showing still another modification of the storage medium insertion process (corresponding to the driver printing process of FIG. 16).

FIG. 17 is a flow chart showing a storage medium insertion process corresponding to the driver printing process of FIG. 16. The storage medium insertion process of FIG. 17 differs from that of FIG. 15 in that the step S51A, S511, S512, S55, S58B, S62B and S64 in FIG. 15 are replaced with steps S51C, S511C, S512C, S55C, S58C, S62C and S64C. Since the other steps are the same as those in FIG. 15, only the difference from FIG. 15 will be described below.

As shown in FIG. 17, the CPU 20 of the printer 1 extracts print data stored in the foremost directory in the first step S51C replacing the step S51A in FIG. 15. Subsequently, the CPU 20 judges whether its operation mode has been set to a multiple display mode or not (S511C). When the operation mode is not the multiple display mode (S511C: NO), the process advances to the aforementioned step S52. When the operation mode is the multiple display mode (S511C: YES), the process advances to the step S512C, in which the CPU 20 displays directory names and creation dates/times of multiple directories created in the USB memory 14 in separate lines (corresponding to the directories) on the display unit 8. In this step S512C, the directory name and creation dates/time of a "target directory" (at first, the foremost directory from which the print data was extracted in S51C) are highlighted. Thereafter, the process advances to the aforementioned step S54. When the operation mode is not the multiple display mode (S511C: NO) and no icon image data has been associated with the print data (S52: NO), the CPU 20 displays the directory name of the print data on the display unit 8 (S55C) and thereafter advances to the step S54.

In the step S58C which is executed when the "NEXT" key is pressed in the waiting state of S54 (S57: YES), the CPU 20 extracts and displays the icon of print data stored in the next directory (or the directory name of the next directory when there is no icon for the print data) when the operation mode is not the multiple display mode, while highlighting the directory name of the next directory when the operation mode is the multiple display mode. Thereafter, the process returns to the step S511C. Similarly, in the step S62C which is executed when the "BACK" key is pressed (S61: YES), the CPU 20 extracts and displays the icon of print data stored in the previous directory (or the directory name of the previous directory when there is no icon for the print data) when the operation mode is not the multiple display mode, while highlighting the directory name of the previous directory when the operation mode is the multiple display mode. Thereafter, the process returns to the step S511C. Incidentally, in the storage medium insertion process of FIG. 17, the display on the display unit 8 is just continued when the process returns to the step S511C and thereafter advances to the step S53, S55C or S512C since the displaying of the icon or the highlighting of the file name has already been carried out in S58C or S62C. In this example, print data and icon image data corresponding to the print data are stored in the same directory (to be associated with each other) as above. Therefore, deletion of related (associated) pieces of data can be carried out at once by deleting the directory with files contained in the directory when a piece of data has become unnecessary.

As set forth hereinabove, the image formation system in accordance with the present invention comprises: a data processing device which stores print data in a portable storage medium and an image formation device which forms an image on a print medium by reading out the print data from the portable storage medium. The data processing device includes: a print data storing unit which stores the print data in the portable storage medium; an image data generating unit which generates image data to be displayed by the image formation device in regard to the print data; and an image data storing unit which stores the image data generated by the image data generating unit in the portable storage medium while associating the image data with the print data. The image formation device includes: a display unit which displays an image corresponding to the image data stored in the portable storage medium; and an image formation unit which forms an image on a print medium based on print data that has been stored in the portable storage medium while being associated with image data corresponding to the image displayed by the display unit when printing is requested in regard to the image displayed by the display unit.

With this configuration, the user is allowed to easily and correctly make the check or selection of print data (stored in the portable storage medium) on the image formation device's side.

Preferably, the image formation device further includes a selection unit which selects an image displayed by the display unit according to a user operation. The image formation unit of the image formation device forms an image on a print medium based on print data that has been stored in the portable storage medium while being associated with image data corresponding to the image selected by the selection unit when printing is requested in regard to the image selected by the selection unit.

With this configuration, the user is allowed to easily select the print data (that should be printed out) on the image formation device's side when multiple pieces of print data have been stored in the portable storage medium.

The image data generating unit of the data processing device may be configured to generate the image data based on a print job identifier corresponding to the print data.

With this configuration, an image formed based on a print job identifier corresponding to the print data can be used as the image for the check or selection of print data, by which the user is allowed to carry out the check or selection of print data with greater ease.

The image data generating unit of the data processing device may also be configured to generate the image data based on a user operation.

With this configuration, an image intended by the user (an image generated based on the user operation) can be used as the image for the check or selection of print data, by which the user is allowed to carry out the check or selection of print data with greater ease.

Various methods can be employed for associating the print data and the image data with each other. For example, the image data storing unit of the data processing device may be configured to make the association between the print data and the image data by assigning a common job identifier to the print data and the image data. The image data storing unit may also be configured to make the association between the print data and the image data by storing the print data and the image data in the same directory, or by integrating the print data and the image data into one file. In these cases where the print data and the image data to be associated with each other are stored in the same directory or integrated into one file, deletion of related (associated) pieces of data can be carried out at once when a piece of data has become unnecessary.

Preferably, when remaining capacity of the portable storage medium is less than a threshold capacity, the print data storing unit of the data processing device stores the print data in the portable storage medium by use of a file name inputted by a user and the image data generating unit of the data processing device cancels the generation of the image data. The display unit of the image formation device displays the file name of the print data stored in the portable storage medium when no image data associated with the print data has been stored in the portable storage medium. The image formation unit of the image formation device carries out the image formation for print data having the file name displayed by the display unit when the printing is requested in regard to the file name displayed by the display unit.

With this configuration, a memory full error of the portable storage medium can be prevented effectively.

Preferably, the image formation device is configured so that its operation mode can be set to a file name display mode. The display unit in the file name display mode displays file names of multiple pieces of print data stored in the portable storage medium in separate lines instead of the displaying of an image. The image formation unit in the file name display mode carries out the image formation for print data having a file name displayed by the display unit when the printing is requested in regard to the file name displayed by the display unit.

With this configuration, the user is allowed to select the file name display mode and make the selection of print data by viewing multiple file names displayed at once. The selection of print data in the file name display mode can be facilitated by previously giving each piece of print data a file name that is easily recognizable to the user.

Preferably, the image data generating unit of the data processing device generates the image data based on a title inputted by a user when the title is inputted as the user operation.

With this configuration, an image generated based on the title inputted by the user can be used as the image for the check or selection of print data, by which the check and selection of print data can be facilitated further.

Preferably, when the title is made up of alphanumeric characters only, the print data storing unit of the data processing device stores the print data in the portable storage medium by use of the title as a file name of the print data, and the image data generating unit of the data processing device cancels the generation of the image data. The display unit of the image formation device displays the file name of the print data stored in the portable storage medium when no image data associated with the print data has been stored in the portable storage medium. The image formation unit of the image formation device carries out the image formation for print data having the file name displayed by the display unit when the printing is requested in regard to the file name displayed by the display unit.

With this configuration, limited capacity of the portable storage medium can be utilized more efficiently by handling alphanumeric titles (having low necessity of bitmapping) just as the file names.

Incidentally, while the generation of the icon is canceled when the remaining capacity of the USB memory 14 is small (S3: YES) in some of the driver printing processes described above, the driver printing process may also be configured to inquire of the user whether to generate the icon or not. Further, the step S55C (displaying of the directory name) in FIG. 17 may be replaced with a step equivalent to the step S512. While the printing of print data is carried out in each storage medium insertion process when the user makes a print request (by pressing the "OK" key) after making the selection of the print data by use of the "BACK" key and the "NEXT" key, the storage medium insertion process may also be configured to allow the user to make the selection and the print request at the same time. The present invention is applicable not only to printers but also to various other image formation devices such as the so-called MFPs (Multi-Function Peripherals) having a printer, scanner, modem, etc. in one body. Further, the portable storage medium used in the present invention for transferring data from the data processing device (e.g. personal computer 300) to the image formation device (e.g. printer 1) is not restricted to a USB memory; various other portable storage media (memory card, CD-R, CD-RW, portable HDD (Hard Disk Drive), etc.) can be used.

What is claimed is:

1. An image formation system comprising:
 a data processing device configured to store print data in a portable storage medium, wherein the print data comprises page description language data; and
 an image formation device configured to form an image on a print medium in response to reading out the print data from the portable storage medium,
 wherein the data processing device comprises:
  a processor; and
  memory operatively coupled to the processor and storing computer readable instructions that, when executed by the processor, cause the data processing device to function as:
   a print data storing unit configured to store the print data in the portable storage medium;
   an image data generating unit configured to generate image data corresponding to the image to be formed on the print medium when the print data is read out, wherein the image data is of a different file format than the print data; and
   an image data storing unit configured to store the image data in the portable storage medium and to associate the image data with the print data stored in the portable storage medium, and
 wherein the image formation device comprises:
  a display unit configured to display an image corresponding to the image data stored in the portable storage medium;
  a selection unit configured to select the displayed image in response to a user operation indicative of a request to print the displayed image; and an image formation unit configured to form the image on the print medium based on the print data associated with the image data corresponding to the selected image.

2. The image formation system according to claim 1, wherein the image data generating unit of the data processing device is further configured to generate the image data based on a print job identifier corresponding to the print data.

3. The image formation system according to claim 1, wherein the image data generating unit of the data processing device is further configured to generate the image data based on a user operation.

4. The image formation system according to claim 3, wherein the image data generating unit of the data processing device is further configured to generate the image data based on a title input by a user.

5. The image formation system according to claim 4, wherein the print data corresponds to a file name based on the title input by the user, and wherein:
 the print data storing unit of the data processing device is further configured to store the print data in the portable storage medium based on the file name;
 the image data generating unit of the data processing device is further configured to cancel the generation of the image data in response to a determination that the title comprises only alphanumeric characters;
 the display unit of the image formation device is further configured to display the file name corresponding to the print data stored in the portable storage medium in response to a determination that no image data associated with the print data is stored in the portable storage medium; and
 the image formation unit of the image formation device is further configured to form the image on the print medium based on the print data having the displayed file name in response to a request to print the displayed file name.

6. The image formation system according to claim 1, wherein the image data storing unit of the data processing device is further configured to associate the print data with the image data by assigning a common job identifier to each of the print data and the image data.

7. The image formation system according to claim 1, wherein the image data storing unit of the data processing device is further configured to associate the print data with the image data by storing the print data and the image data in the same directory.

8. The image formation system according to claim 1, wherein the image data storing unit of the data processing device is further configured to associate the print data with the image data by integrating the print data and the image data into one file.

9. The image formation system according to claim 1, wherein:
 the print data storing unit of the data processing device is further configured to store the print data in the portable storage medium based on a file name input by a user;
 the image data generating unit of the data processing device is further configured to cancel the generation of the image data in response to a determination that a remaining capacity of the portable storage medium is less than a threshold capacity;
 the display unit of the image formation device is further configured to display the file name corresponding to the print data stored in the portable storage medium in response to a determination that no image data associated with the print data is stored in the portable storage medium; and
 the image formation unit of the image formation device is further configured to form the image on the print medium based on the print data corresponding to the displayed file name displayed in response to a request to print the displayed file name.

10. The image formation system according to claim 1, wherein:
 the image formation device is further configured to operate in a file name display mode;
 the display unit, in the file name display mode, is configured to display a plurality of file names respectively corresponding to a plurality of print data stored in the portable storage medium;
 the image selection unit, in the file name display mode, is configured to select one of the plurality of displayed file names in response to a user operation indicative of a request to print the one of the plurality of displayed file names; and
 the image formation unit, in the file name display mode, is configured to form the image on the print medium based on the print data corresponding to the selected file name.

11. The image formation system of claim 1, wherein the image data generating unit is configured to generate the image data by converting a character string representing a title for the print data and including the converted character string as part of the image data.

12. The image formation system of claim 1, wherein the computer readable instructions, when executed, further cause the data processing device to function as an icon data selecting unit configured to:
 determine a user selection of an icon from a plurality of icons; and
 determine the image data associated with the print data from the selected icon.

13. A data processing device comprising:
 a processor; and
 memory operatively coupled to the processor and storing computer readable instructions that, when executed by the processor, cause the data processing device to function as:
  a print data storing unit configured to store print data in a portable storage medium, wherein the print data comprises page description language data;
  an image data generating unit configured to generate image data corresponding to an image to be formed on the print medium when the print data is printed, wherein the image data is of a different file format than the print data; and
  an image data storing unit configured to store the image data in the portable storage medium and to associate the image data with the print data stored in the portable storage medium.

14. The data processing device according to claim 13, wherein the image data generating unit is further configured to generate the image data based on a print job identifier corresponding to the print data.

15. The data processing device according to claim 13, wherein the image data generating unit is further configured to generate the image data based on a user operation.

16. The data processing device according to claim 13, wherein the image data storing unit is further configured to associate the print data with the image data by assigning a common job identifier to each of the print data and the image data.

17. The data processing device according to claim 13, wherein the image data storing unit is further configured to associate the print data with the image data by storing the print data and the image data in the same directory.

18. The data processing device according to claim 13, wherein the image data storing unit is further configured to associate the print data with the image data by integrating the print data and the image data into one file.

19. The data processing device of claim 13, wherein the image data generating unit is configured to generate the image data by converting a character string representing a title for the print data and including the converted character string as part of the image data.

20. The data processing device of claim 13, wherein the computer readable instructions, when executed, further cause the data processing device to function as an icon data selecting unit configured to:
   determine a user selection of an icon; and
   determine the image data associated with the print data from the selected icon.

21. A non-transitory computer-readable recording medium storing computer-readable instructions that, when executed, cause a computer to function as:
   a print data storing unit configured to store print data in a portable storage medium, wherein the print data comprises page description language data;
   an image data generating unit configured to generate image data corresponding to an image to be formed on a print medium when the print data is printed, wherein the image data is of a different file format than the page data; and
   an image data storing unit configured to store the image data in the portable storage medium and to associate the image data with the print data stored in the portable storage medium.

22. The non-transitory computer readable medium of claim 21, wherein the image data generating unit is configured to generate the image data by converting a character string representing a title for the print data and including the converted character string as part of the image data.

23. The non-transitory computer readable medium of claim 21, wherein the computer readable instructions, when executed, further cause the computer to function as an icon data selecting unit configured to:
   determine a user selection of an icon; and
   determine the image data associated with the print data from the selected icon.

24. An image formation device comprising:
   a display unit configured to display an image based on image data stored in a portable storage medium in association with print data for image formation, wherein the print data comprises page description language data and wherein the image corresponds to an image to be formed on a print medium when the print data is printed, the image data being of a different file format than the print data; and
   an image formation unit configured to form the image on the print medium based on the print data associated with the image data corresponding to the displayed image in response to a request to print the displayed image.

25. The image formation device according to claim 24, further comprising a selection unit configured to select a displayed image in response to a user operation indicative of a request to print the displayed image, wherein:
   the image formation unit is further configured to form the image on the print medium based on the print data associated with the image data corresponding to the selected image.

26. The image formation device of claim 24, wherein the image data is generated by converting a character string representing a title for the print data and including the converted character string as part of the image data.

27. The image formation device of claim 24, wherein the image data associated with the print data is determined from a user selected icon.

* * * * *